S. A. SEVERTSEN & L. D. SCHWAB.
FISHING DEVICE.
APPLICATION FILED JUNE 30, 1916.
1,208,671. Patented Dec. 12, 1916.
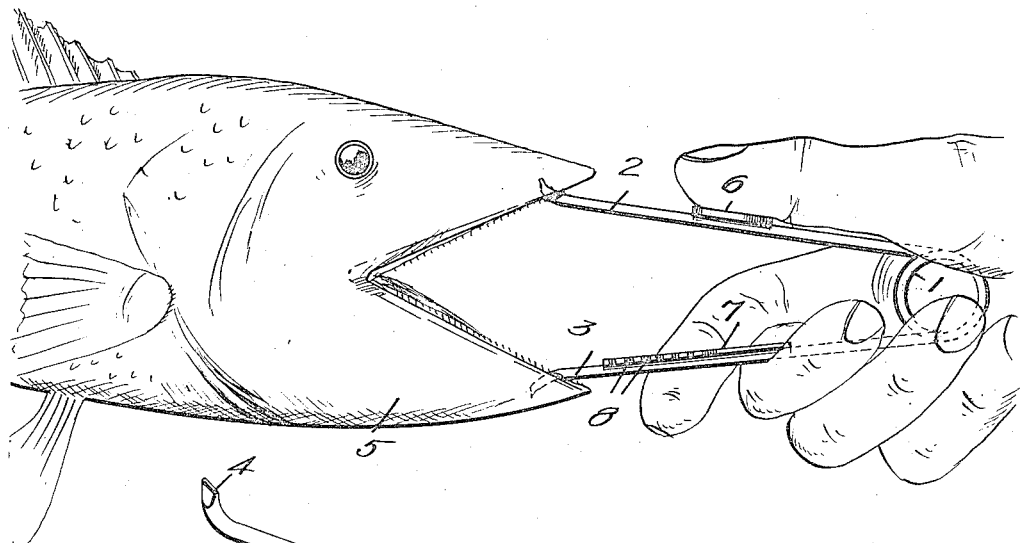
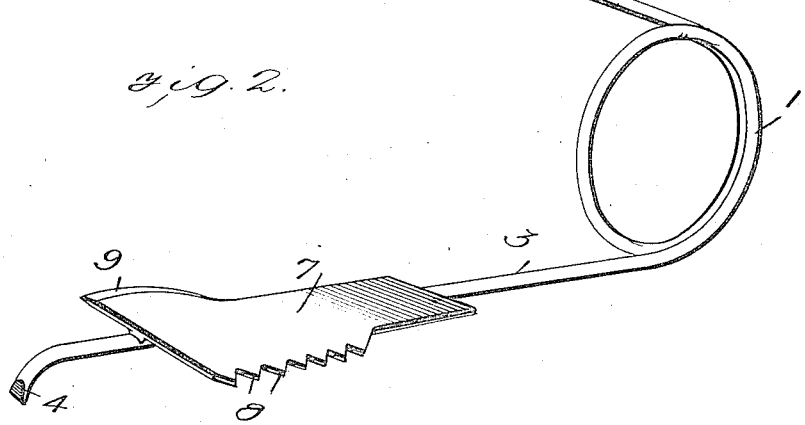
WITNESSES
H. G. Barry
H. E. Beck
INVENTORS:
Sven A. Severtsen
Louie D. Schwab
BY
ATTORNEYS

UNITED STATES PATENT OFFICE.

SVEN A. SEVERTSEN AND LOUIE D. SCHWAB, OF DEER RIVER, MINNESOTA, ASSIGNORS OF ONE-HALF TO OWEN E. HULEHAN, OF DEER RIVER, MINNESOTA.

FISHING DEVICE.

1,208,671.  Specification of Letters Patent.  Patented Dec. 12, 1916.

Application filed June 30, 1916.  Serial No. 106,797.

*To all whom it may concern:*

Be it known that we, SVEN A. SEVERTSEN and LOUIE D. SCHWAB, citizens of the United States, and residents of Deer River, in the county of Itasca and State of Minnesota, have invented an Improvement in Fishing Devices, of which the following is a specification.

Our invention is an improvement in fishing devices and has for its object to provide mechanism of simple form for opening and holding open the mouth of a fish, for facilitating the extraction of the hook, wherein means is also provided in connection with the said device for permitting the fish to be easily scaled and cleaned, and for handling fish in general.

In the drawings: Figure 1 is a side view showing the device in operation. Fig. 2 is a perspective view.

The present embodiment of the invention is composed of wire of suitable cross section bent to form a coil, and diverging arms 2 and 3. Each arm is provided at its free end with an outwardly extending lug 4, and the said lugs are beveled as shown to provide cutting edges or teeth. The coil 1 provides a connection and a spring between the arms, and it will be evident that when the arms are pressed or moved toward each other, and are then released, the spring will expand the arms and will hold them expanded.

In use, the arms 2 and 3 are moved toward each other, until their pointed ends 4 may be inserted within the mouth of the fish, indicated at 15. To facilitate the handling of the tool, plates 6 and 7 are secured on the arms at convenient points to be grasped by the thumb and fingers of the operator. The plate 6 is merely a disk, as shown, but plate 7 is provided with a series of teeth 8 on one edge, and with a rounded cutting edge 9 on the other edge. With the teeth 8, the fish may be scaled, and with the knife or plate 9 it may be cleaned. The edges of the lugs 4 prevent slipping and disengagement of the tool.

The device is useful for handling fish in general, that is for picking up the fish from the boat and transferring them to another boat, a box or other receptacle.

It will be obvious that the coil might be omitted, the arms being connected together.

We claim:

A device of the character specified, composed of wire bent to form a pair of arms extending alongside each other, and diverging slightly toward their outer ends, each arm having at the outer end thereof an outwardly bent lug, and a finger piece on each arm for facilitating manipulation thereof, one of the said finger pieces having one edge beveled, and the other provided with teeth, for the purpose specified.

SVEN A. SEVERTSEN.
LOUIE D. SCHWAB.

Witnesses:
OWEN E. HULEHAN,
AGNES E. SWEUM.